United States Patent [19]

Krumrein et al.

[11] Patent Number: 4,483,605
[45] Date of Patent: Nov. 20, 1984

[54] CIRCUIT FOR A COMPUTERIZED PHOTOFLASH CONTROL

[75] Inventors: Gerhard Krumrein, Neuenstadt; Hartmut Hantsch, Bad Friedrichshall, both of Fed. Rep. of Germany

[73] Assignee: Telefunken Electronic GmbH, Heilbronn, Fed. Rep. of Germany

[21] Appl. No.: 506,818

[22] Filed: Jun. 22, 1983

[30] Foreign Application Priority Data

Jul. 8, 1982 [DE] Fed. Rep. of Germany ......... 322557

[51] Int. Cl.³ .............................................. G03B 15/05
[52] U.S. Cl. .................................... 354/417; 354/418; 354/145.1
[58] Field of Search ..................... 354/416, 417, 145.1, 354/418

[56] References Cited

U.S. PATENT DOCUMENTS 4,241,279 12/1980 Numata ............................... 354/417
4,426,143 1/1984 Mizokami ........................... 354/416
4,442,381 4/1984 Numata ............................... 354/416

FOREIGN PATENT DOCUMENTS

| | | |
|---|---|---|
| 2843745 | 4/1979 | Fed. Rep. of Germany . |
| 3007625 | 10/1980 | Fed. Rep. of Germany . |
| 3015055 | 10/1980 | Fed. Rep. of Germany . |
| 3039858 | 5/1981 | Fed. Rep. of Germany . |
| 3022135 | 12/1981 | Fed. Rep. of Germany . |
| 3105152 | 2/1982 | Fed. Rep. of Germany . |
| 3031001 | 3/1982 | Fed. Rep. of Germany . |
| 104324 | 8/1981 | Japan .................................. 354/416 |

*Primary Examiner*—Russell E. Adams
*Attorney, Agent, or Firm*—Spencer & Frank

[57] ABSTRACT

The invention relates to a circuit for a computerized photoflash control which is supplied, preferably with the aid of a photographic element, with a current corresponding to the reflected light during the flash, from which an electrical quantity terminating the flash is derived. The invention consists in that the circuit contains a comparator, with a voltage derived from the current supplied at one of its inputs, while the other input of the comparator is supplied with an adjustable reference voltage. Connected to the output of the comparator is a switching path which is actuated by the comparator upon signal output, thereby terminating the flash.

16 Claims, 4 Drawing Figures

CIRCUIT FOR A COMPUTERIZED PHOTOFLASH CONTROL

BACKGROUND OF THE INVENTION

The invention relates to a circuit for a computerized photoflash control which is supplied with a current of a certain magnitude and from which an electrical quantity terminating the flash is derived.

Computerized photoflash circuits are known in which the reflected light is measured, and a dimension is derived from this light measurement, with the help of which the flash is terminated automatically or in an adjustable manner.

It is an object of the invention to provide an integratable circuit for a computerized photoflash control by means of which several operating functions can be fulfilled and which comprises a simple voltage supply with as little power consumption as possible. For example, there must be the possibility of adjusting varying lens stops or film sensitivities and of enabling switch-over to manual operation or to operation with fixedly adjustable flash times.

SUMMARY OF THE INVENTION

According to the Invention there is provided a circuit comprising a comparator, at one input of which there is a voltage derived from the current supplied, while an adjustable reference voltage is fed to the other input of the comparator, and a switch path activated by the switch-over operation of the comparator is connected to the output of the comparator.

The flash is terminated via the above-mentioned circuit path actuated by the comparator output, for example, by deriving current from the flashlight electrolytic capacitor or by interrupting the current flow between the flashlight electrolytic capacitor and the flash lamp. The aforementioned current of a certain magnitude may be determined with the help of a selectable fixed resistor for setting a fixed flash time. Automatic flash control is acquired if the current supplied is generated in a photographic receiver, in which case this current serves as a measure of the reflected flash light.

The computerized photoflash circuit preferably contains a constant current source in the form of a current amplifier resp. a current mirror whose output current circuit comprises a potentiometer. The reference voltage is generated at this potentiometer in dependence upon the set output current of the current amplifier. It is preferable to use a further potentiometer in the input current circuit of the current amplifier for setting the above-mentioned current. For receiving the reflected flash light a photodiode is preferably used whose diode current serves, with the aid of a following current amplifier, in amplified form, to charge a capacitor. The capacitor voltage is simultaneously applied to one comparator input. This current amplifier which serves the purpose of amplifying the photo current also preferably takes the form of a current mirror.

In an advantageous embodiment of the invention, the computerized photoflash circuit contains a so-called standby unit for generating the stabilized internal supply voltage for the comparator, the current amplifiers and the current sources in order to reduce the power consumption. This unit is only activated when a flash pulse is triggered, whereas during the times between successive flashes this same unit ensures a safe discharge of the capacitor which was previously charged by the photo current.

BRIEF DESCRIPTION OF THE DRAWINGS

The invention and its further advantageous development are described hereinafter in greater detail, with reference to examples of embodiments.

DESCRIPTION OF THE PREFERRED EMBODIMENTS

Figure 1:
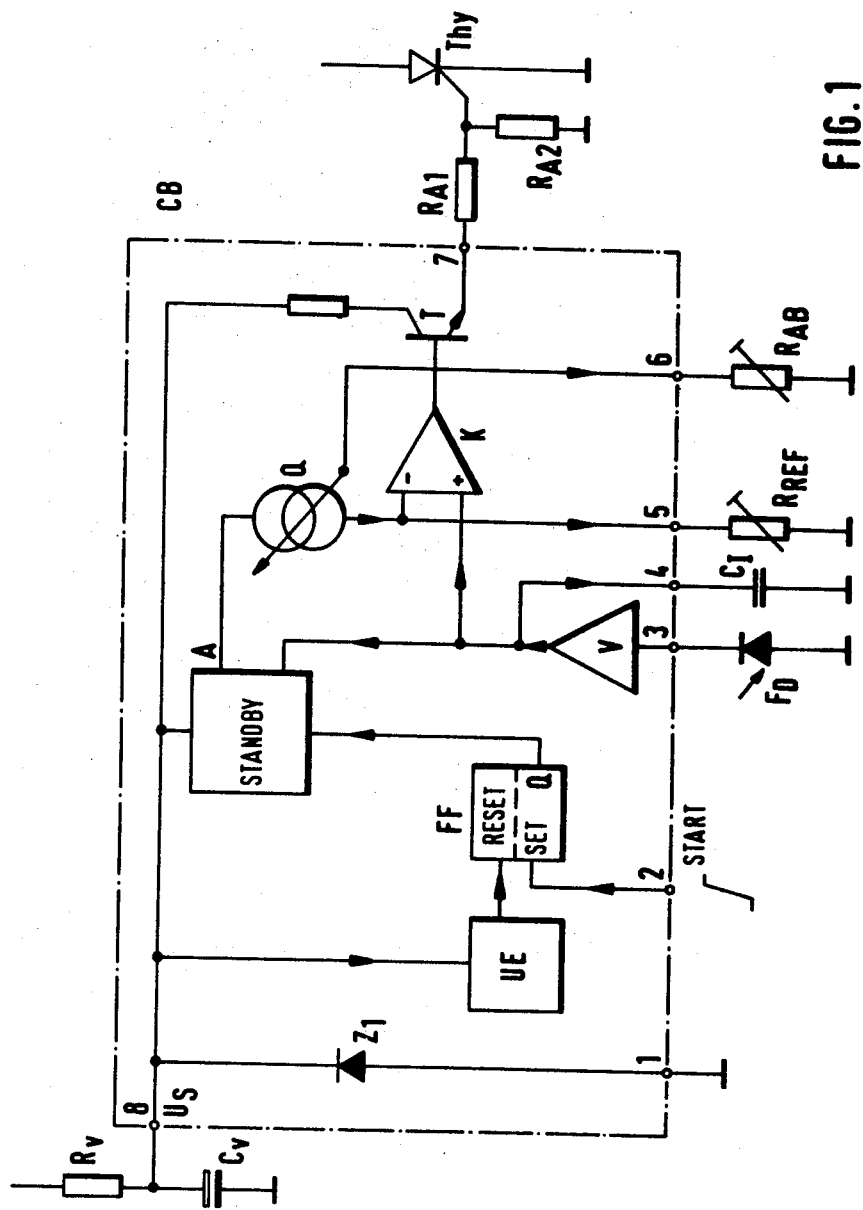
FIG. 1 shows a block circuit diagram of the integrated semiconductor circuit according to the invention with its external connecting points and the components provided for connection to the integrated circuit.

FIG. 1 shows the block circuit diagram of the integrated circuit CB for the computerized photoflash control. Voltage supply is provided via a high-impedance resistor $R_V$ directly from the flashlight electrolytic capacitor. An internal zener diode $Z_1$ stabilizes the supply voltage $U_S$ at a supply current of, for example, 100 $\mu$A to, for example 17.8 V. The zener diode $Z_1$ actually consists of a series circuit of individual zener diodes and diodes which are operated in flow direction, with the number of diodes being chosen such that the desired supply voltage $U_S$ is available at point 8. The charged capacitor $C_V$ which is connected to the series resistor $R_V$ supplies the circuit CB during active operation. In order to reduce current input, the internal voltage supply is switched off at point A during standby operation. Simultaneously, it is ensured that the integration capacitor $C_I$ connected to the output point 4 cannot charge itself, so that outside light cannot have a disturbing effect. When the flash unit is switched on, the circuit CB is switched to standby operation via the undervoltage recognition circuit UE. This is done with the help of a settable and resettable storage cell FF which is set with the flash pulse at the input 2, thus causing activation of the connected standby unit for generating the internal supply voltage. The starting pulse at the input 2 of the circuit is generated upon the actuation of the flash and is made available at the input 2 as a positive voltage jump.

If the external supply voltage decreases when a flash is terminated, owing to the discharge of the capacitor $C_V$, and drops below a defined voltage value, the undervoltage recognition circuit UE resets the storage cell FF, which causes the standby circuit to switch off the internal supply voltage and the capacitor $C_I$ to be discharged.

The reflected light during the flash hits the photographic receiver FD at the connection point 3 of the circuit CB. This photographic receiver can be a photodiode, a phototransistor or a photoresistor. In the photodiode, a current is generated proportional to the light, which then is amplified by the current amplifier V, and charges the capacitor $C_I$ in this amplified form. The integration voltage occurring at $C_1$ is fed to the + input of the comparator K. At the − input of the comparator K the reference voltage which is determined by the potentiometers $R_{REF}$ and $R_{AB}$ at the circuit connection points 5 and 6 is applied. The aligning resistor $R_{AB}$ is located in the input circuit and the resistor $R_{REF}$ is located in the output circuit of a current amplifier which is designated Q in FIG. 1. The current flowing out of the connection point 5 is set to a defined value by means of the aligning resistor $R_{AB}$ at the connection point 6. The adjustable reference voltage is determined by this defined current and the value of the reference resistor $R_{REF}$. This reference voltage may, for example, be adjusted by changing the resistor $R_{REF}$ within the limits of 0.2 V to 10.5 V, which results in an alteration of the operating lens stop.

The comparator output is connected to an output transistor T which supplies a current pulse by means of which, for example, a following cancelling thyristor Thy is triggered. The flash is then terminated, with the help of this triggered thyristor path, in the manner described above. In the connecting-through phase of the transistor T, the supply capacitor $C_V$ is quickly discharged, causing the undervoltage recognition circuit UE to respond, which then sets the integrated circuit into standby operation with switched-off internal supply voltage following the resetting of the storage element FF. The capacitor $C_I$ then discharges via the standby circuit and is kept in this discharged condition until a further flash pulse occurs. The supply capacitor $C_V$ is once again charged to its supply voltage which is defined by the zener diode path $Z_1$.

Figure 2:
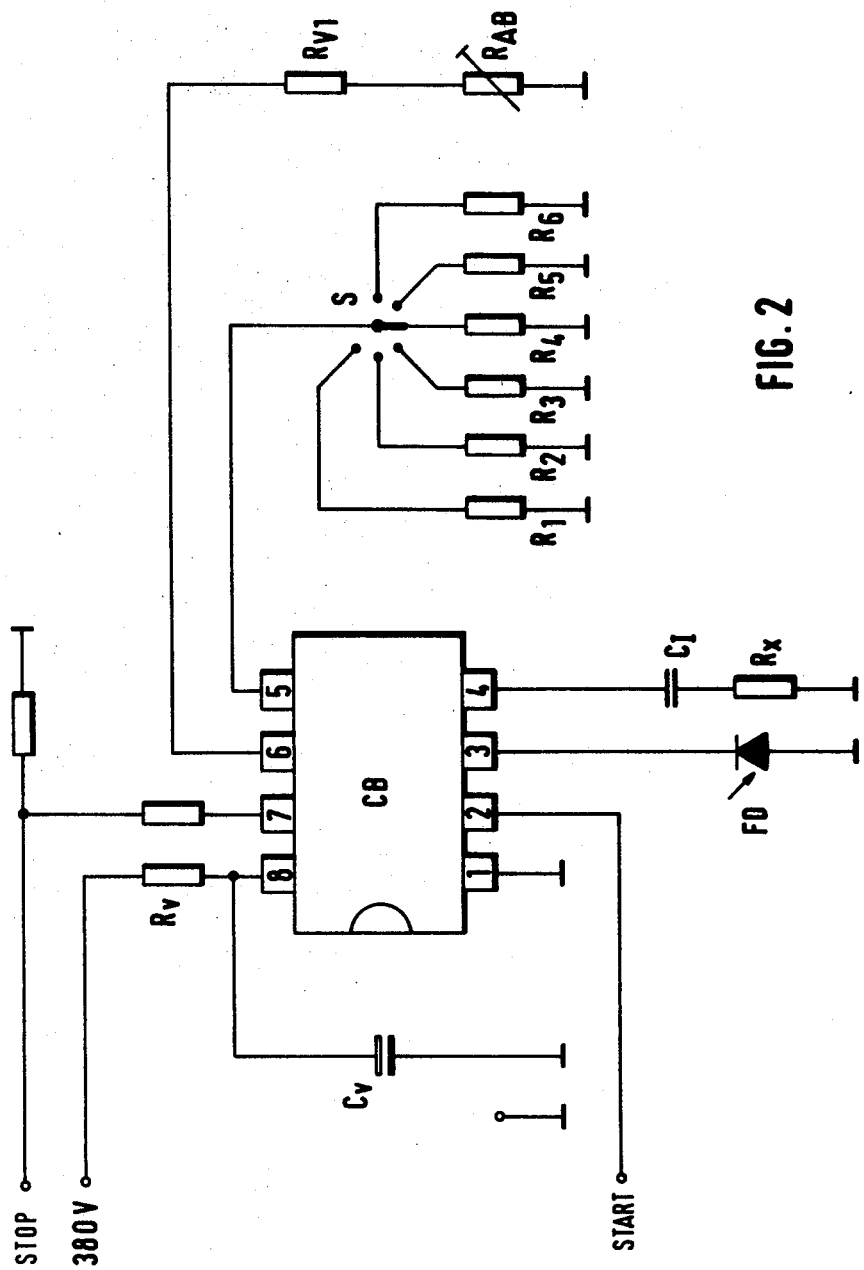
FIG. 2 shows an external circuitry of the integrated circuit for setting varying operating lens stops.

The operating lens stops may be adjusted by varying the storage capacitor $C_I$ or by varying the reference resistor $R_{REF}$. FIG. 2 shows a circuit for setting several operating lens stops by varying the reference resistor. Here, the reference resistor $R_{REF}$ has been replaced by the fixed resistors $R_1$ through $R_6$, with one resistor each being connected to the connection point 5 of the integrated circuit CB via the switch S. The fixed resistor corresponding to an operating lens stop is always twice the size of the resistor corresponding to the preceding operating lens stop.

Manual operation is possible if the connection point 4 is grounded by bridging the capacitor $C_I$ and the resistor $R_X$. This results in the blocking of the comparator and the flash no longer being switched off. In the embodiment shown in FIG. 2, a maximum of 6 operating lens stops can be set if a voltage range of between 0.2 and 6.4 V can be used for reference voltage at the − input of the comparator. The setting of smaller reference voltages is difficult because of the S/N ratio which would then be too low.

If the photodiode FD at the connection point 3 is replaced by a fixed resistor, the integration capacitor $C_I$ is charged with a constant current. This enables fixed flash times to be set.

Figure 3:
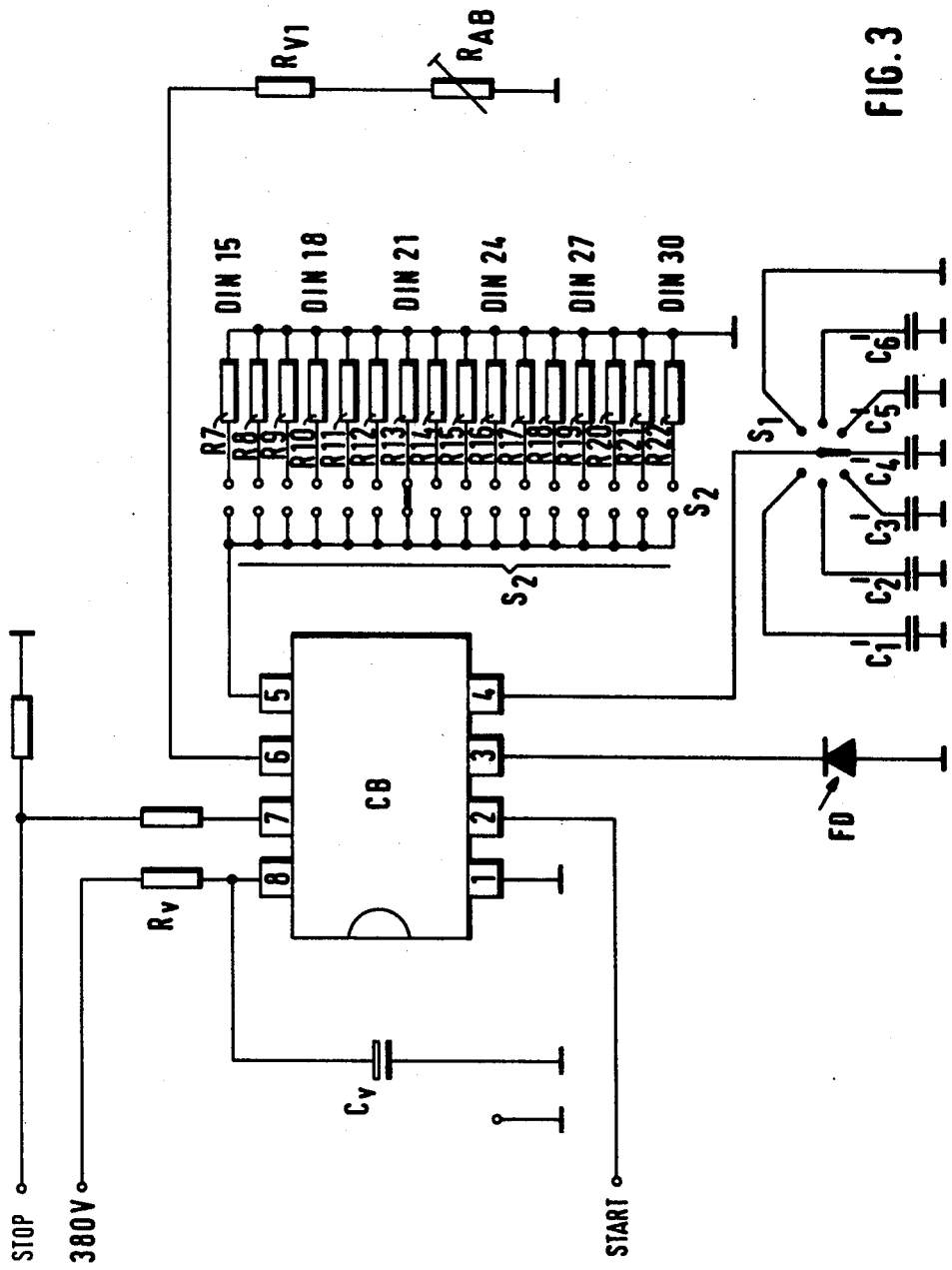
FIG. 3 shows an external circuitry by means of which both varying operating lens stops and the film sensitivities can be set.

In FIG. 3, a circuit with setting possibilities for 6 operating lens stops with 6 integration capacitors and 16 DIN film insensitivities with 16 programming resistors is shown. Of the 6 integration capacitors $C_1'$ to $C_6'$, one each is connected to the connection point 4 of the integrated circuit CB via the switch $S_1$ in accordance with the operating lens stop selected. The film sensitivity is selected by means of the switch $S_2$ via which one of the resistors $R_7$ to $R_{22}$ corresponding to one film sensitivity, respectively, is connected to the connection point 5 of the integrated circuit.

Figure 4:
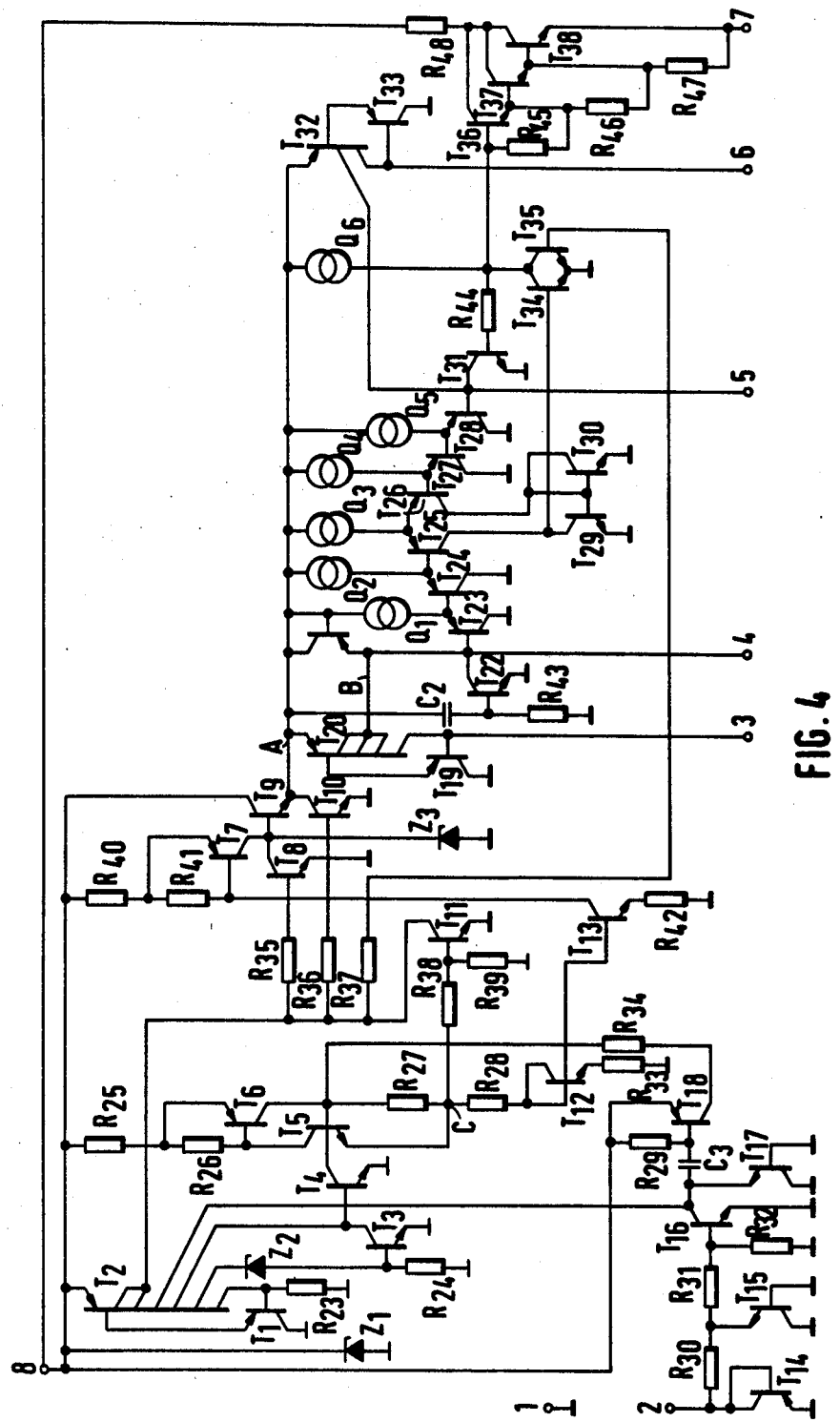
FIG. 4 finally also shows the detailed circuitry of the integrated circuit.

The interior set-up of the integrated circuit CB is apparent from FIG. 4.

The external supply voltage is stabilized—as mentioned above—with the help of the zener diode path $Z_1$ at a defined value, for example, at 17.8 V, at the connection point 8. The current amplifier consisting of the transistors $T_1$ and $T_2$ together with the zener diode path $Z_2$ and the resistors $R_{23}$, $R_{24}$ as well as the transistor $T_3$ forms the undervoltage recognition circuit.

The undervoltage at which this circuit responds is defined by means of the zener diode $Z_2$ in a collector branch of the multi-collector transistor $T_2$. At voltages above 12 V at the connection point 8, for example, a voltage driving the transistor $T_3$ drops at the resistor $R_{24}$ so that the following transistor $T_4$ remains blocked and the storage flip-flop circuit consisting of transistors $T_6$, $T_5$ and of the resistors $R_{26}$, $R_{27}$ can remain in its set condition. If, however, the voltage amount defined by the zener diode $Z_2$ is no longer reached, a voltage is available at resistor $R_{24}$ which no longer suffices for driving the transistor $T_3$. Since transistor $T_3$ is blocked in this case and the transistor $T_4$ is driven by the collector current derived from the transistor $T_2$, the storage flip-flop circuit is reset since the base electrode of the transistor $T_5$ is put on reference potential via the connected-through transistor $T_4$.

With no current at transistors $T_5$, transistor $T_6$ also can no longer be supplied with sufficient base current so that both current paths formed by the storage cell are switched off and no current can be picked up at the output point C of the storage flip-flop circuit. Transistor $T_{11}$ which is connected to the output point C consequently blocks so that the current of this current branch which, in turn, is derived from a collector of the multi-collector transistor $T_2$ opens the following transistors $T_8$, $T_{10}$ and $T_{35}$ via the series resistors $R_{35}$, $R_{36}$ and $R_{37}$. The input potential at the transistor $T_9$ thus practically drops to reference potential so that the zener diode path $Z_3$ remains without current. The emitter of the transistor $T_9$ which also constitutes the output connection A of the standby circuit is also put on reference potential via the opened transistor $T_{10}$ so that the internal supply voltage is switched off. The capacitor at connection point 4, if charged, is then quickly discharged via the diode path of the transistor $T_{21}$.

When the supply voltage at the connection point 8 once again reaches its nominal value through charging of the capacitor connected at that point, transistor $T_3$ is switched-through and transistor $T_4$ is thus blocked, however nothing changes at first with respect to the stable storage condition of the storage flip-flop circuit, since a positive pulse which is generated during flash activation is required at the circuit connection point 2 for setting the storage flip-flop circuit.

The transistor $T_{14}$ is first connected to the connection point 2 and forms a protective diode against negative voltages. These negative voltages are directed off via the transistor $T_{14}$ which is connected as a diode. A zener diode $T_{15}$ which is connected to the connection point 2 via the resistor $R_{30}$ limits the voltage to a defined value and thus serves as overvoltage protection. This limited voltage is then fed via the voltage divider $R_{31}$, $R_{32}$ to the base connection of transistor $T_{16}$ which is driven so that the capacitor $C_3$ can reverse its charge and a base current briefly opens transistor $T_{18}$ during this charge reversal phase. The transistor $T_{17}$ which is also connected to the capacitor $C_3$ forms a zener diode and limits the voltage at the capacitor to a maximum value which this capacitor accepts in the blocked state of the transistor $T_{16}$. Through the opening of the transistor $T_{18}$, the base electrode of the transistor $T_5$ in the storage flip-flop circuit receives a triggering pulse which becomes active simultaneously on account of the blocking of the transistor $T_4$ and opens the transistor $T_5$. The transistor $T_6$ is also opened because of the voltage drop at the resistor $R_{26}$ so that current can be picked up at the output point C of the storage flip-flop circuit. The storage flip-flop circuit is thus set in a stable state and a current flows which opens the transistors $T_{11}$ and $T_{12}$. The transistors $T_8$, $T_{10}$ and $T_{35}$, however, no longer get sufficient drive current, which causes them to block. A current therefore flows from the current supply capacitor at the connection point 8 through the resistor $R_{40}$ and the transistor $T_7$, resulting in a voltage build-up at the zener diode path $Z_3$. This voltage is also fed to the connection point A, however, it is reduced by a base emitter voltage. The internal supply voltage is therefore available to the remaining circuit components. The current flow via the zener diode path $Z_3$ is enabled by the transistors $T_{12}$ and $T_{13}$ being opened owing to the output current of the storage flip-flop circuit so that the voltage drop at resistor $R_{41}$ is sufficient for driving the transistor $T_7$.

Since the internal supply voltage at the connection point A of the circuit is also available upon flash actuation, the current sources $Q_1$, $Q_2$, $Q_3$, $Q_4$, $Q_5$ and $Q_6$ can provide the respective output current resulting from the special design of these current sources. The same applies to the current amplifier comprised of the transistors $T_{19}$, $T_{20}$ and $T_{32}$ and $T_{33}$, respectively.

The photographic receiver is connected to the connection point 3 of the integrated circuit. In this photographic receiver there flows a current corresponding to the light reflected as input current into the collector of the transistor $T_{20}$. Since this transistor takes the form of a current amplifier, an output current flows via output collectors of this transistor $T_{20}$ into the capacitor $C_I$ which is connected to the connection point 4. By dimensioning the surfaces of the different collectors of the transistor $T_{20}$ it is, for example, possible to set a current amplification ratio of 3.5. The capacitor voltage which is to be compared to the reference voltage therefore builds up at the base electrode of the transistor $T_{23}$. The reference voltage is defined and set with the help of the current amplifier comprised of the transistors $T_{32}$, $T_{33}$ and the resistors at the connection points 5 and 6. It is applied to the base connection of transistor $T_{28}$.

As long as the reference voltage is greater than the voltage at the base connection of transistor $T_{23}$, the current determined by the current source $Q_3$ flows through the transistor $T_{25}$. The transistor $T_{26}$ is blocked so that the transistors $T_{30}$ and $T_{29}$ also receive no base current. These two transistors are therefore similarly blocked so that the current flowing through the transistor $T_{25}$ reaches the base electrode of the transistor $T_{34}$ which it opens. The current delivered by the current source $Q_6$ therefore flows via the transistor $T_{34}$ since the transistor $T_{35}$ is blocked.

When the voltage at the capacitor at the connection point 4 exceeds the reference voltage at the base connection of the transistor $T_{28}$, the transistor $T_{26}$ of the comparator becomes conductive and opens the transistors $T_{29}$ and $T_{30}$. The transistor $T_{34}$ of the output gate consequently no longer receives any base current, causing this transistor to block, with the current delivered by the current source $Q_6$ flowing to the base connection of the output transistor $T_{36}$ which it connects through. The output transistor is constructed as a Darlington transistor with the transistors $T_{36}$, $T_{37}$ and $T_{38}$ with the respective base leak resistors $R_{45}$, $R_{46}$ and $R_{47}$ so that all these transistors are connected through, owing to the output signal of the comparator comprised by the transistors $T_{23}$ to $T_{28}$. The output stage which is connected through triggers further switching processes which take the current away from the flash lamp so that the flash is terminated. Simultaneously, the capacitor $C_V$ which is connected to the connection point 8 of the circuit quickly discharges via the transistors $T_{36}$ to $T_{38}$, causing the undervoltage recognition circuit to respond in the manner described and the storage flip-flop circuit with the transistors $T_5$ and $T_6$ to be set back into the currentless state. The internal supply voltage at the connection point A is thereby switched off again and the capacitor at the connection point 4 can discharge to reference potential via the diode path of the transistor $T_{21}$.

At very low reference voltages, the capacitor at the connection point 4 may only be charged up to a very low voltage in order to terminate the flash. In such cases, this low voltage may drop immediately after the build-up of the internal supply voltage because of parasitic transistor capacities at the base electrode of the transistor $T_{23}$, so that no flash occurs at all. In order to prevent this from happening, the capacitor $C_2$ provided is first charged during the voltage rise of the internal supply voltage. During the charging time which is selected to be of short duration, the transistor $T_{22}$ connected to the capacitor $C_2$ is open so that the base connection point of the transistor $T_{23}$ is sure to be kept at reference potential. Only after the capacitor $C_2$ is charged, does the transistor $T_{22}$ block, and the capacitor $C_I$ connected to the connection point 4 of the circuit can be charged by the output current of the current amplifier $T_{20}$. By dimensioning the capacitor $C_2$ and the resistor $R_{43}$, this switch-on phase is selected to be so short that it will be of no significance during the flash. This measure does, however, ensure that a flash definitely occurs even when extremely short flash times are set.

The comparator comprised of transistors $T_{23}$ to $T_{28}$ is set up in the manner of a differential amplifier with series stages. The transistors $T_{34}$ and $T_{35}$ form an output gate via which the output signal of the comparator is coupled out and then directed to the final stage consisting of the transistors $T_{36}$ to $T_{38}$. The current sources $Q_1$ to $Q_6$ preferably also take the form of current amplifiers in the conventional manner. Insofar as not already described, the linking of the individual circuit components is apparent from FIG. 4. This Figure also shows which transistors are of the positive-negative-positive line type and which are of the negative-positive-negative line type.

What is claimed is:

1. A circuit for a computerized photoflash control which is supplied with a current of a certain magnitude, from which an electrical quantity terminating the flash is derived, wherein the circuit contains a comparator (K), with a voltage derived from the current supplied at one of its inputs (+), while the other input (−) of the comparator (K) is supplied with an adjustable reference voltage, and wherein a switching path (T, Thy) actuated by the switch-over operation of the comparator is connected to the output of the comparator.

2. Computerized photoflash circuit according to claim 1, characterized in that the current is fed to the circuit with the aid of a photographic receiver which takes up the reflected flash light.

3. Computerized photoflash circuit according to claim 1, characterized in that the current is determined with the aid of a fixed resistor for the setting of a fixed flash time.

4. Computerized photoflash circuit according to claim 1, characterized in that there is provided in the form of a current amplifier a constant current source (Q) whose output current is fed to a potentiometer ($R_{REF}$), at which the reference voltage fed to the comparator (K) decreases, and in that the input current of the current amplifier is adjustable by means of a further potentiometer ($R_{AB}$) located in the input current circuit.

5. Computerized photoflash circuit according to claim 2, characterized in that there is provided for taking up the reflected light a photodiode (FD) which is followed by a current amplifier (V) with an adjusted current amplification ratio, and in that the output of the current amplifier (V) is connected to a capacitor ($C_I$) at which the voltage which corresponds to the photographic current and is connected to one comparator input (+) decreases.

6. Computerized photoflash circuit according to claim 1, characterized in that a unit (STANDBY) is provided to generate a stabilized internal supply voltage for the comparator (K), the current amplifiers (V, Q) and the current sources, and in that this unit is only activated when a flash pulse is generated and ensures a safe discharge of the capacitor ($C_I$), previously charged by the current supplied, during the times between successive flashes.

7. Computerized photoflash circuit according to claim 6, characterized in that there is provided a settable and resettable storage cell (FF) which is set with the flash pulse and thereby triggers the activation of the connected unit (STANDBY) for generation of the internal supply voltage, and in that there is provided an undervoltage recognition circuit (UE) which triggers the resetting of the storage cell (FF) and thus the switching off of the unit (STANDBY) for generation of the internal supply voltage and the discharge of the capacitor ($C_I$) when a defined voltage value is not reached by the external supply voltage.

8. Computerized photoflash circuit according to claim 1, characterized in that the external supply voltage decreases at a current supply capacitor ($C_V$) which is connected to the flashlight electrolytic capacitor and discharges via the switching path (T) controlled by the comparator output when the flash is terminated, and in that the undervoltage recognition circuit (UE) is connected to this current supply capacitor so that when the voltage drops below a defined value at the current supply capacitor, the storage cell (FF) is reset and the internal supply voltage is simultaneously switched off.

9. Computerized photoflash circuit according to claim 4, characterized in that the operating lens stop is adjustable by means of the potentiometer ($R_{REF}$) in the output current circuit of the current amplifier (Q).

10. Computerized photoflash circuit according to claim 9, characterized in that the potentiometer ($R_{REF}$) in the output current circuit of the current amplifier (Q) is replaced by a number of fixed resistors, with one fixed resistor each corresponding to one operating lens stop being connected to the output current circuit by means of a switch (S), and in that the fixed resistor corresponding to one operating lens stop is twice the size of the resistor corresponding to the preceding operating lens stop.

11. Computerized photoflash circuit according to claim 1, characterized in that the capacitor ($C_I$) connected to the current amplifier (V) is replaced by a number of capacitors ($C_1'-C_6'$) with one capacitor each corresponding to one operating lens stop being connected to the current amplifier (V) via a switch ($S_1$).

12. Computerized photoflash circuit according to claim 11, characterized in that the potentiometer ($R_{REF}$) in the output current circuit of the current amplifier (Q) is replaced by a number of fixed resistors ($R_7-R_{22}$), with one fixed resistor each corresponding to one film sensitivity being connected to the output current circuit of the current amplifier (Q) via a switch ($S_2$).

13. Computerized photoflash circuit according to claim 1, characterized in that a shorting of the capacitor ($C_1$) and thus a direct connection of the current amplifier output to mass potential is provided for manual operation.

14. Computerized photoflash circuit according to claim 1, characterized in that a diode path $Z_3$ at which the internal supply voltage decreases when the storage cell is set is switched current-less by resetting the storage cell (FF), and the output (A) of the unit (STANDBY) is connected to mass potential to generate this internal voltage supply by means of driving a transistor switch ($T_{10}$), so that the capacitor ($C_1$) can discharge via a further diode path ($T_{21}$).

15. Computerized photoflash circuit according to claim 1, characterized in that there is connected to the output (A) of the unit (STANDBY) to generate the internal supply voltage an additional capacitor ($C_2$) which is charged during the switch-on phase of the supply voltage and keeps the capacitor ($C_I$) connected to the current amplifier at reference potential via a transistor switch ($T_{22}$), so that this capacitor ($C_1$) is only charged via the current amplifier ($T_{20}$) after completion of a switch-on phase of defined duration and after blocking of the transistor $T_{22}$.

16. Computerized photoflash circuit according to claim 1, characterized in that the comparator is set up in the mode of a differential amplifier ($T_{23}-T_{28}$), and in that the output signal for driving the final stage ($T_{36}-T_{38}$) is coupled out via a gate circuit ($T_{34}$, $T_{35}$).

* * * * *